United States Patent [19]

Potter

[11] 4,386,781
[45] Jun. 7, 1983

[54] ANNULAR FLUID FACE SEAL WITH DIAPHRAGM

[75] Inventor: Charles W. Potter, Manchester, England

[73] Assignee: J. H. Fenner & Co., Ltd., Yorkshire, England

[21] Appl. No.: 283,625

[22] Filed: Jul. 15, 1981

[30] Foreign Application Priority Data

Jul. 17, 1980 [GB] United Kingdom ................. 8023469

[51] Int. Cl.³ .............................................. F16J 15/36
[52] U.S. Cl. ....................................... 277/38; 277/42; 277/81 R; 277/88; 277/93 SD
[58] Field of Search .......................... 277/81 R, 88–91, 277/93 R, 93 SD, 94, 38–43

[56] References Cited

U.S. PATENT DOCUMENTS

| | | | |
|---|---|---|---|
| 2,894,770 | 7/1959 | Payne | 277/38 |
| 3,042,414 | 7/1962 | Tracy | 277/93 R X |
| 3,245,692 | 4/1966 | Voitik | 277/40 |
| 3,419,279 | 12/1968 | Tracy | 277/89 X |
| 3,751,046 | 8/1973 | Goluber et al. | 277/88 |

FOREIGN PATENT DOCUMENTS

| | | | |
|---|---|---|---|
| 605938 | 9/1960 | Canada | 277/89 |
| 646420 | 11/1950 | United Kingdom | 277/93 SD |
| 755238 | 8/1956 | United Kingdom | 277/38 |

Primary Examiner—Robert S. Ward, Jr.
Attorney, Agent, or Firm—Alan Ruderman

[57] ABSTRACT

A face-seal arrangement for effecting a fluid seal between a housing and a shaft rotatable therein and comprising a sleeve-like diaphragm interposed between an annular shell and a sealing member and having compression spring means loading the diaphragm outwardly relative to the shell further includes a forged sealing ring having a profiled periphery thereto, a sealing surface being provided on the sealing member for engagement with a smooth sealing surface on the sealing ring. The arrangement is a unitized structure in that the sealing ring is held captive relative to the annular shell with the spring-loaded sealing member interposed therebetween and freely movable in the axial direction of the arrangement.

8 Claims, 1 Drawing Figure

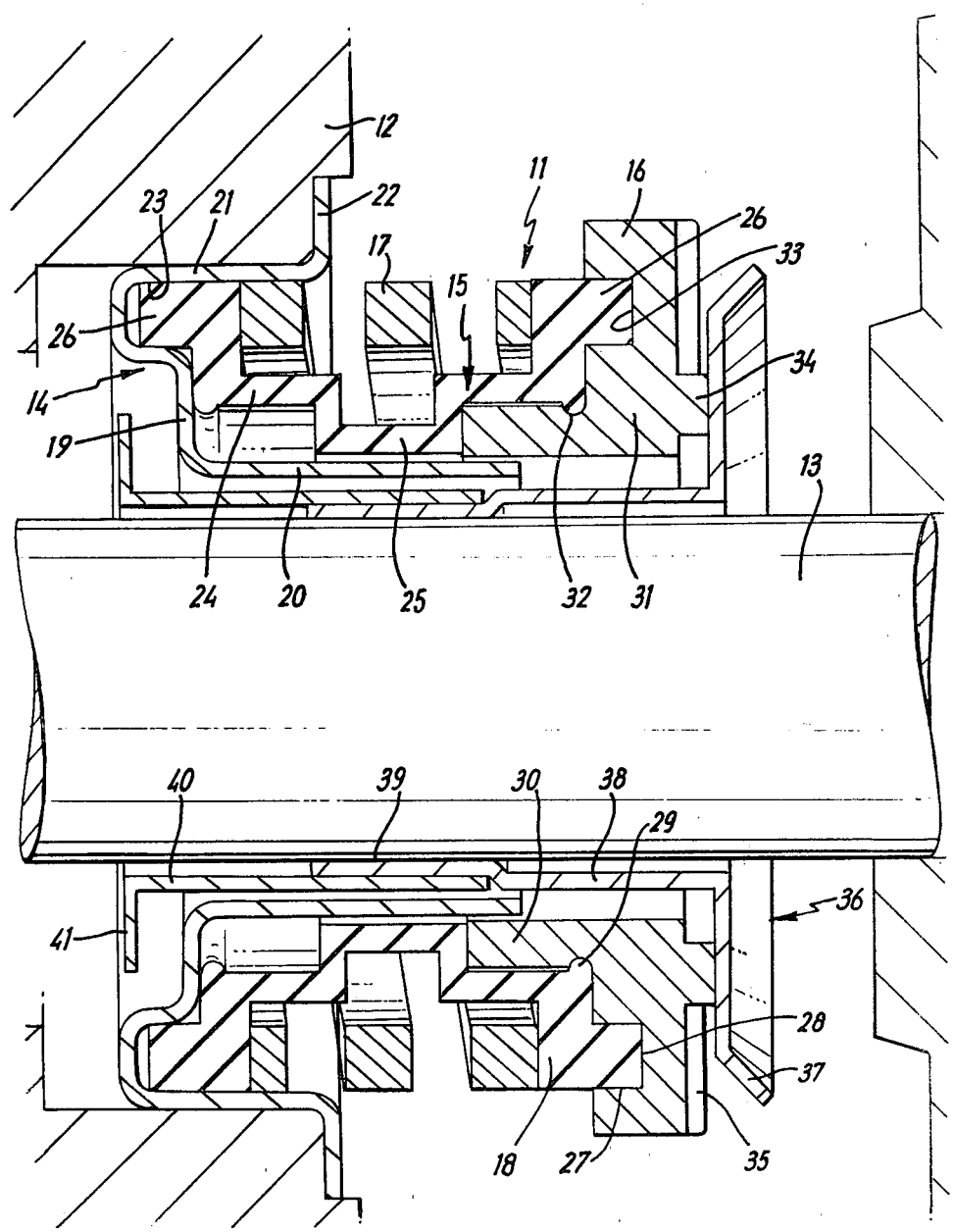

ANNULAR FLUID FACE SEAL WITH DIAPHRAGM

The invention concerns an annular fluid seal, and has more particular reference to an arrangement intended to provide a seal between a housing and a shaft rotatable therein.

With increasing demands for fuel economy in automotive vehicles the design trend is to increase the coolant circulating temperature and pressure so as to avoid steam pockets in critical areas such as those adjacent to the valve seats since overheating in this region results in loss of power at continuous high speed. The increased parameters have imposed more arduous conditions on pump bearings and seals.

The widespread adoption and use of face-type seals has almost entirely eliminated compression packing systems, and in the context of such face-type seals the condition of the finish on the sliding surfaces of the seal elements is now a critical factor in determining seal efficiency, surface finishes in the region of 10 micro inches CLA being the norm.

The present methods of pump assembly can result in damage to the running surfaces and various solutions to the problem have been proposed to avoid defective seals. The tendency is to seek to improve the situation by introduction of special materials, for example ceramic and sintered metals, interposed between the impeller hub and the seal surfaces. The low cost of sintered materials is attractive, but in compaction of the powders a degree of porosity must necessarily remain. Infiltration with resin of metallic materials can improve the surface but add to the overall cost. Furthermore resin-type infiltration is superficial and the resin has no affinity for the matrix. Furnace infiltration using metal increases the cost to an unacceptable level. The progressive removal of surface resins on sintered materials with continuing use produces a detritus at the sliding surface by the cutting action of the voids and results in progressively heavy damage and premature seal failure.

According to the present invention there is proposed a seal arrangement for effecting a fluid seal between a housing and a shaft rotatable therein comprising an annular shell, a spring-loaded diaphragm seated in said shell, a sealing member adjacent that end of the diaphragm remote from the shell and movable in the axial direction of the seal under the effect of the spring-loaded diaphragm, the said sealing member having an annular sealing surface at an outer face thereof, and a sealing ring arranged in opposed disposition relative to the sealing member for co-operation with the annular sealing surface to effect a fluid seal therebetween, the annular shell and sealing ring being respectively mounted in the housing and on the shaft, or vice versa, characterised in that the sealing ring comprises a forged element having an annular part with a profiled periphery and a smooth surface to receive the sealing surface into direct sealing engagement therewith.

According to a preferred feature the profiled periphery of the sealing ring comprises a frusto-conical peripheral flange.

According to a further preferred feature the peripheral flange is flared outwardly at that side of the sealing ring remote from the sealing member.

According to a still further feature, the diaphragm includes spaced radial flanges and such diaphragm is spring-loaded by a compression spring extending therebetween, the spring conveniently being formed from material of rectangular transverse cross-section.

The invention will now be described further, by way of example only, with reference to the single FIGURE of the accompanying drawing which illustrates one embodiment thereof in axial section.

Referring to the drawing, a seal arrangement 11 for effecting a fluid seal between a housing 12 and a shaft 13 rotatable therein, for example the impeller shaft of the coolant pump of the engine of a motor vehicle, comprises an annular shell 14 of generally U-shaped cross-section engaged in the housing, a sleeve-like diaphragm 15 of nitrile rubber or other suitable elastomer material seated in the said shell, a phenolic/carbon sealing member 16 at the end of the diaphragm remote from the shell and a compression spring 17 extending between radially outwardly directed flanges 18 at the respective ends of the diaphragm.

The shell 14 comprises an annular disc portion 19 of stepped configuration and inner and outer sleeve portions 20, 21, there being a radially outwardly directed flange 22 at the free edge of the outer sleeve portion 21 and such outer sleeve portion being of lesser axial extent than the inner such portion 20. The stepped configuration of the annular disc portion 19 defines a seating 23 for a purpose hereafter to be made apparent.

The diaphragm 15 includes a stepped cylindrical body part 24 of generally constant wall thickness, the central portion 25 being of reduced diameter and the bore thereof being small clearance on, such as, under pressure, to be supported by, the inner sleeve portion 20 of the shell. Each of the flanges 18 of the diaphragm includes an axially extending rim 26 at the periphery of the outer face thereof.

The outer peripheral face 27 and the back face 28 of each rim are inclined to the axis and to the radial plane of the shaft respectively by approximately 5° to give a forward and radially inward taper to each such face.

A rib 29 is provided at the inner periphery of the body part at each end thereof, the ribs being of semi-circular or rectangular transverse cross-section and of small dimensions.

The sealing member 16 has an axial flange 30 at the inner periphery of an annular body part 31, the bore of flange 30 and body part 31 being clearance on the inner sleeve portion 20 of shell 14 and the outside diameter of flange 30 is a clearance fit in the larger diameter bore of the diaphragm 15. A groove 32 is provided in the sealing member in the angle between the body part 31 and flange 30 to receive a rib 29 of the diaphragm into engagement therewith. At its rear face the annular body part 31 is provided with a further groove 33 of rectangular cross-section. An annular sealing surface 34 of rectangular cross-section is provided at the front face of the body part 31 such surface being arranged in closely spaced disposition relative to the bore of the body part, and such face further includes a plurality of radial ribs 35 between surface 34 and the outer periphery of member 16.

The seal arrangement further includes a sealing ring 36 of annular form having a forwardly and outwardly flared flange 37 at its outer periphery and a rearwardly extending cylindrical inner sleeve 38 at its inner periphery, and the sleeve being stepped to provide an end portion 39 of reduced diameter which is an interference fit on shaft 13 and a clearance fit within the inner sleeve portion 20 of shell 14. The sealing ring is completed by an outer sleeve 40 arranged as a press fit on the reduced dimension end portion 39 of inner sleeve 38, there being a radially outwardly directed flange 41 at the outer end of such outer sleeve 40.

On assembly, the rims 26 provided on the flanges 18 of the diaphragm are engaged with seating 23 of the shell and groove 33 of the phenolic/carbon sealing member 16, respectively, flange 30 of member 16 being a free-sliding fit on the inner sleeve portion 20 of the shell 14 and member 16 being urged outwardly of the shell by compression spring 17. Member 16 is drivingly connected with inner sleeve portion 20 whilst being freely movable axially thereof by co-operation between three equispaced keys (not shown) extending from the surface of the sleeve engaged with respective complementary grooves (not shown) in the bore of flange 30. The form and dimensions of the rims 26 in relation to the seating and groove are such that the same are deformed and accordingly make sealing contact with the seating and groove respectively.

Assembly of the arrangement is completed by introduction of the inner and outer sleeves 38, 40 into the bore of the inner sleeve part 20 of the shell, the sealing ring 36 lying in opposed disposition relative to the sealing surface 34 and the flange 41 at the end of the inner sleeve lying opposite the stepped end of the shell, the said sleeves being an interference fit one with the other thus to give a unitary seal arrangement wherein the smooth sealing face of the sealing ring is protected against damage.

The invention is not restricted to the exact features of the embodiment hereindisclosed since alternatives will readily present themselves to one skilled in the art. Thus, for example, the annular sealing ring may be increased in diameter relative to the sealing member and the flared peripheral flanges extend rearwardly rather than forwardly.

Whilst it is preferred to utilise a spring of square cross-section material in view of the improved performance thereby achieved and the avoidance of the necessity of providing ferrules at the spring ends present with conventional springs made from materials of circular cross-section, springs of other forms may be utilised if desired.

Furthermore, whilst in the case of the embodiment hereindescribed the shell is located in the housing and the sealing ring is mounted on the shaft for rotation therewith, it may be required in some circumstances that the shell be carried by the rotary member and the sealing ring be the static element and carried by the housing, and the invention is to be construed accordingly.

What is claimed is:

1. A face seal arrangement for effecting a fluid seal between a housing and a shaft rotatable therein, comprising an annular shell, a diaphragm seated in said shell and having an end remote from the shell, a spring applying a loading to said diaphragm, a sealing member adjacent said end of the diaphragm and movable in the axial direction of the seal under the effect of the spring-loaded diaphragm, the said sealing member having an annular sealing surface at an outer face thereof, and a sealing ring arranged in opposed disposition relative to the sealing member for cooperation with the annular sealing surface to effect a fluid seal therebetween, the annular shell and sealing ring being respectively mountable in the housing and on the shaft, or vice versa, the improvement being that the sealing ring comprises a forged element having an annular part with a profiled periphery and a smooth surface to receive the sealing surface into direct sealing engagement therewith.

2. A face seal arrangement as claimed in claim 1 wherein said profiled periphery comprises a frusto-conical peripheral flange.

3. A face seal arrangement as claimed in claim 2, wherein the peripheral flange is flared outwardly at a side of the sealing ring remote from the sealing member.

4. A face seal arrangement as claimed in claim 1 wherein said annular part has an inner periphery and the sealing ring includes a sleeve at said inner periphery for press fit engagement with the shaft.

5. A face seal arrangement as claimed in claim 1 wherein the shell and sealing ring are connected together for limited motion therebetween in the common axial direction thereof to provide a unitized structure.

6. A face seal arrangement as claimed in claim 4, wherein the sleeve extending from the sealing ring has a free end, the shell has an inner diameter and an end remote from the sealing ring, further including a sleeve having a flange and engageable with said free end, said flange being oversize in relation to said inner diameter and lying axially outwardly of said shell at said end thereof thus to hold the shell captive relative to the sealing ring with the diaphragm interposed therebetween.

7. A face seal arrangement according to claim 6 wherein said sleeve is stepped inwardly between said annular part and said free end.

8. A face seal arrangement as claimed in claim 1, wherein the diaphragm includes spaced radial flanges and said spring is a compression spring formed from material of rectangular transverse cross-section and is interposed between said radial flanges.

* * * * *